Sept. 30, 1969  R. J. MUNSEY  3,469,491
SELF-TAPPING SCREW
Filed May 10, 1966
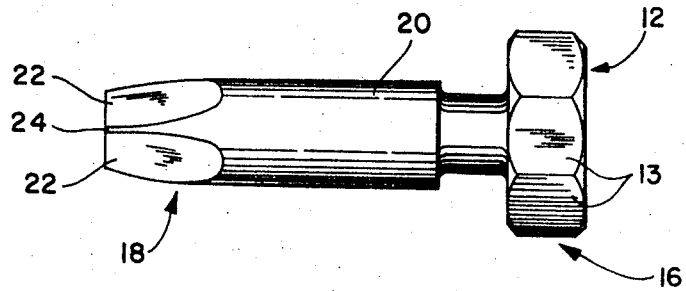
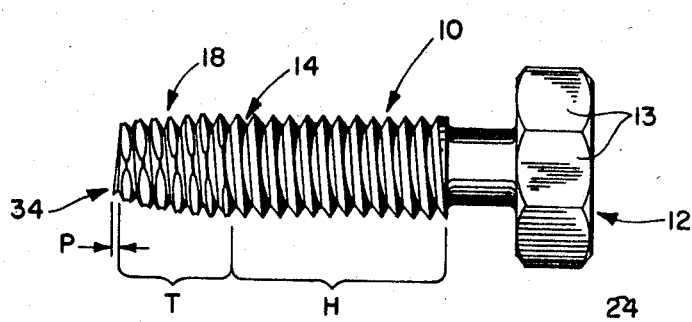
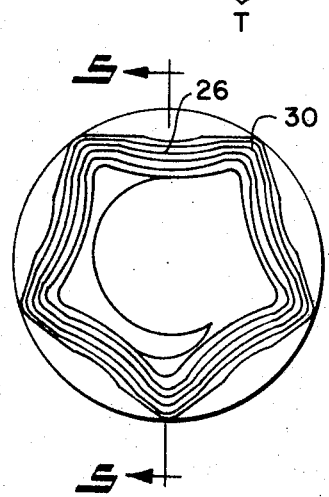
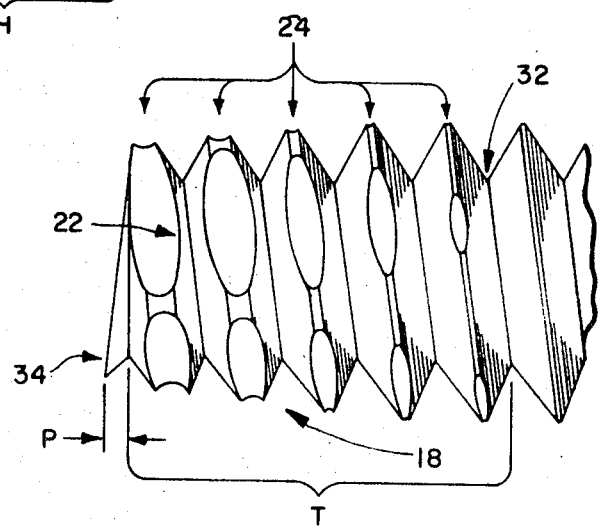
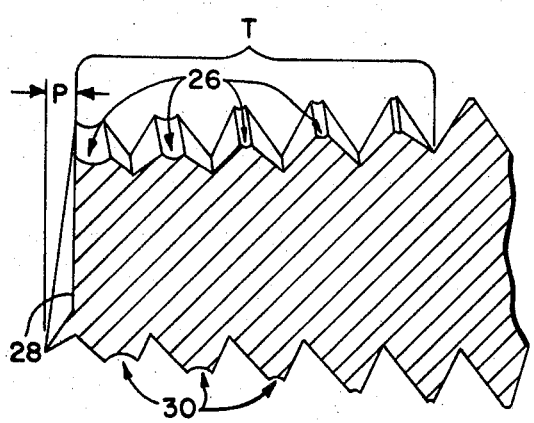
INVENTOR
ROBERT J. MUNSEY
BY *Teague & Toddy*
ATTORNEYS United States Patent Office 3,469,491
Patented Sept. 30, 1969

3,469,491
SELF-TAPPING SCREW
Robert J. Munsey, Verona, Pa., assignor to Eaton Yale & Towne Inc., Cleveland, Ohio, a corporation of Ohio
Filed May 10, 1966, Ser. No. 549,018
Int. Cl. F16b *33/02;* B23g *9/00;* B21h *3/02*
U.S. Cl. 85—47                                      3 Claims

ABSTRACT OF THE DISCLOSURE

A self-tapping screw including head and shank portions for securing members together comprising a continuous threaded tapping portion at one end of the shank portion. The tapping portion is tapered with concave threaded relief portions, polygonal in radial cross section, and has a continuous incomplete thread extending to the end of the body member. The thread of the tapping portion has a plurality of noncutting lobular thread turning portions intermediate the threaded relief portions for swaging threads in the worked material to thereby obtain improved securing power.

---

This invention relates to self-tapping screws or the like, for securing, connecting or attaching pieces together, and more particularly, to screws of the self-tapping or thread forming type for connecting pieces together.

In the past, numerous self-tapping screws have been designed which cut mating threads in the side wall of a pilot hole disposed in relative hard materials to be joined and these prior types of self-tapping screws generally have a threaded shank which is interrupted adjacent the tip thereof, to form abrupt cutting edges for cutting the desired size and style of thread therein. The present screw departs from this cutting practice and relies basically on a "swaging action" which involves the reshaping or reforming of a relative hard material to form a plurality of threads therein, instead of the cutting and removal of some material as would result from a cutting edge being disposed on the threaded shank of a self-tapping screw.

It is well known that a swaged thread is considerably stronger than a cut thread inasmuch as the cutting operation to form the thread merely removes a portion of the material without adding any strengthening characteristics, whereas, the swaged thread produces a stronger and tougher thread, because the material is subjected to a plastic deformation or flow which refines the grain structure thereof, to impart improved strength properties thereto. Moreover, the particles or chips created by a cutting action are extremely troublesome to dispose of and a large amount of torque is required to initially begin the cutting action of the thread which sometimes causes a canting or leaning of the screw relative to the geometric axis of the pilot hole, causing the screw to tap threads in the wall portion of the pilot hole, which have a longitudinal axis angularly inclined with respect to the geometric axis of the pilot hole. Thus, upon final application of the screw to the working surface of the material, the screw shank will not be axially aligned with the geometric axis of the pilot hole, but will be canted or angularly positioned within the pilot hole and thus may create a defective connection. This may result in breaking or shearing of the shank of the screw as a result of the increased torque necessary to bring the bearing surface of the screw head into contact with the material to effectively secure the screw and material together.

An object of the present invention is a provision of a new and improved screw for shaping or forming threads in the side wall of a pilot hole by the swaging action of a tapered self-tapping or thread forming portion to produce a stronger and improved thread without the formation of chips.

Another object is the provision of a new and unobvious self-tapping screw having a relatively long holding section; a short, tapered, polygonal, lobular thread forming section, and a pilot section formed by at least one thread extending axially beyond the end of the threaded screw shank.

Other objects and purposes of this invention will be apparent to persons acquainted with self-tapping screws of this general type upon reading the following specification in conjunction with the accompanying drawings.

In the drawings:

FIGURE 1 is a side elevation of a screw blank,

FIGURE 2 is a side elevational view of the present invention showing the thread holding, self-tapping and pilot sections, FIGURE 3 is an enlarged fragmentary side elevation of the threaded self-tapping and pilot sections of the invention, FIGURE 4 is an end view of the screw disclosed in FIGURE 3, FIGURE 5 is a section of the threaded self-tapping and pilot sections taken along line 5—5 of FIGURE 4.

Referring to FIGURES 1–5 of the drawing more in detail wherein like numerals have been utilized to denote similar parts throughout FIGURES 1–5, and for the purpose of illustrating one practical embodiment of the present invention as shown in FIGURE 2, the screw element 10 has a conventional head portion 12, having tool engaging surfaces 13 interconnected to a threaded shank 14 which includes three sections designated by the letters H, T and P. The section H refers to the holding portion of the screw and is provided with a conventional thread with the major, minor and pitch diameters of the thread of this section being of standard uniform circular configuration.

The section T denotes the self-tapping portion of the screw which is integral with the holding section H. Section T is formed by providing a screw blank 16, as shown in FIGURE 1, with a tapered portion 18 formed on shank 20 at the end remote from head portion 12. In the preferred embodiment, a plurality of intermediate or flattened areas 22 are angularly spaced about the periphery of tapered portion 18, thus forming in cross-section a polygonal self-tapping section. The flattened areas 22, preferably five, converge inwardly toward the geometric axis of the shank 20 and the arcuate turning portions 24, disposed intermediate the flattened areas 22, likewise converge towards the geometric axis of the shank 20. The screw blank 16 has threads of any desired style and number per inch formed on the outer surface thereof by conventional thread forming operations. However, it is preferred that the threading operation of the blank 16 be performed by rolling the shank 20 of screw blank 16, including the tapered section 18, through a pair of mated thread rolling dies (not shown) of conventional construction for producing a continuous thread in the H, T and P sections as shown in FIGURES 2–5. However, by utilizing such thread rolling dies on the tapered section 18, an incomplete thread is formed both on the arcuate turning portions 24 and the intermediate areas 22 of the blank 16 as shown in the drawing. Such thread is evinced by thread crest portions 30 formed on turning portion 24 and thread crest portions or relief areas 26 formed in the intermediate areas 22, both of which are not fully formed due to the lack of material in the tapered section 18. The cross-sections of the crest portions of relief areas 26, as shown in FIGURE 5, are concave or dished inwardly toward the geometric axis of shank 14 in directions both transverse and parallel to the geometric axis thereof. These dished or concave relief areas 26, formed in the intermediate areas 22 create a pressure relief areas that are longitudinally aligned and progressively increase in area from the holding section H toward the end 28 of shank 14. Further, each relief area 26 of section T merge with adjacent crest portions 30 to form a plurality of lobular substantially non-cutting thread forming surfaces disposed along the thread of the self-tapping portion T which decrease in length from the holding section H toward end 28 of the shank 14.

The thread root diameter 32 of self-tapping section T is continuous with the thread root diameter of holding section H. However, the root diameter 32 is progressively reduced from the holding section H toward the shank end 28.

A helical pilot thread 34 continuous with the thread of the self-tapping section T extends axially beyond the end 28 of shank 14 of self-tapping screw 10 and extends arcuately and inwardly about the geometric axis of shank 14 for an angular distance of not more than 250°.

Therefore, a new and improved thread swaging screw has been created having a plurality of non-cutting lobular thread swaging turning portions for swaging threads in relative hard materials by the plastic deformation of the material created by the rotary sliding and wedging pressure to induce plastic flow of the material both radially outwardly and inwardly to increase the hardness and tensile strength to thereby impart superior strength characteristics to the newly created threaded portion.

Although a particular preferred embodiment of the invention has been disclosed for illustrative purposes, it will be understood that variations or modifications thereof which lie within the scope of the invention are fully contemplated.

The embodiments of the invention in which an exclusive privilege or property is claimed or defined is as follows:

1. A self-tapping screw comprising:
   an elongated body member;
   a head portion disposed on one end of the body member having a tool receiving surface for tightening the screw to a working surface and with the head having a greater diameter than the diameter of the body member;
   a major portion of the length of the body member comprising a relatively long helically threaded holding section of uniform outside thread diameter;
   a relatively short helically threaded tapered self-tapping section integral with the holding section and with the thread of the self-tapping section being continuous with the thread of the holding section and extending continuously to the end of the body member opposite the head portion end, said thread of the self-tapping section being an incomplete thread and being defined by a thread root, the thread root extending continuously and uninterrupted from said head portion to said end of the body member opposite said head portion, and by a thread crest which decreases in diameter and increases in axial width from the holding section to said opposite end;
   the self-tapping section having five pressure relief areas in each thread convolution, each pressure relief area being concave in a direction transverse to the geometric axis of the body member and being formed in the crest of the thread of the self-tapping section the relief areas progressively increasing in width and length from the holding section toward said opposite end;
   and each of said relief area thread crests gradually merging with adjacent tapping section thread crests to form lobular turning portions having crests of greater diameter than the relief area crests thereby defining a substantially non-cutting surface on each of the turning portions, said lobular turning portions having a blunt, rounded apex in a circumferential direction for swaging threads in relative hard material by the plastic deformation of the material created by rotary sliding and wedging pressure to induce plastic flow both radially outwardly and inwardly to increase the hardness and tensile strength of the newly created threaded area.

2. The self-tapping screw of claim 4 wherein:
   a helically threaded pilot section is formed by a thread extending axially beyond the end of the self-tapping section and inwardly toward the body member.

3. The self-tapping screw of claim 2 wherein:
   the helical pilot thread extends about the geometric axis of the body member for an angular distance of not more than 250°.

References Cited

UNITED STATES PATENTS

| | | | |
|---|---|---|---|
| 1,676,482 | 7/1928 | Lapotterie. | |
| 448,347 | 3/1891 | Jones | 85—41 |
| 635,297 | 10/1899 | Caldwell | 85—46 |
| 2,352,982 | 7/1944 | Tomalis | 85—48 |
| 3,180,126 | 4/1965 | Carlson | 85—47 |
| 3,218,905 | 11/1965 | Reiland | 85—47 |

FOREIGN PATENTS 1,022,355  3/1966  Great Britain.

EDWARD C. ALLEN, Primary Examiner

U.S. Cl. X.R.

10—10, 152